May 21, 1946. T. J. ERDMAN 2,400,745
GRAIN DRILL
Filed July 7, 1944 3 Sheets-Sheet 1

*INVENTOR.*
THEODORE J. ERDMAN
BY
ATTORNEYS

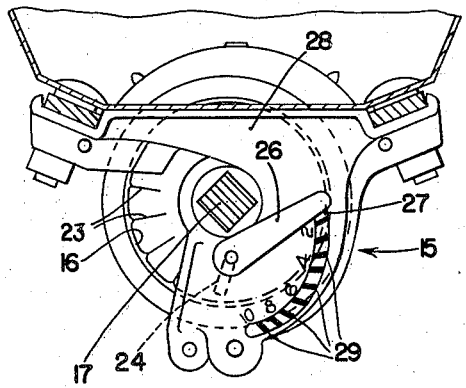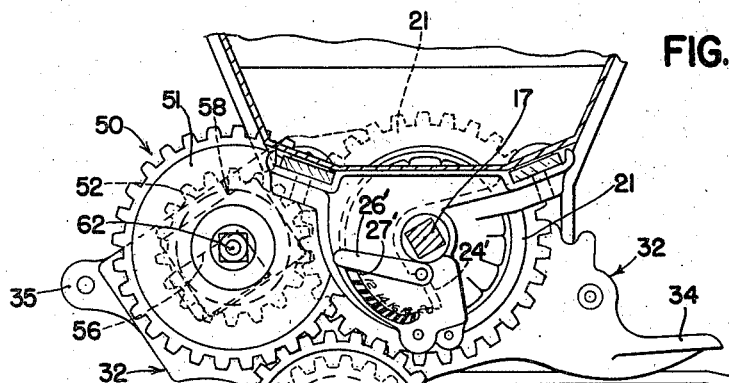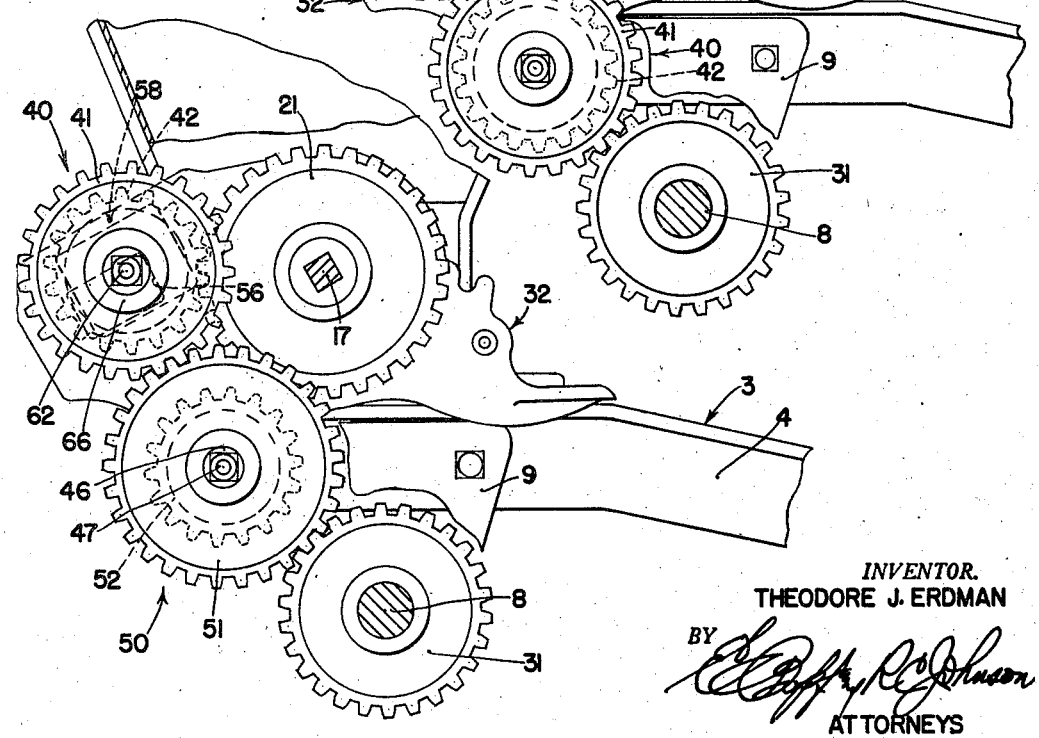

May 21, 1946.    T. J. ERDMAN    2,400,745
GRAIN DRILL
Filed July 7, 1944    3 Sheets-Sheet 3
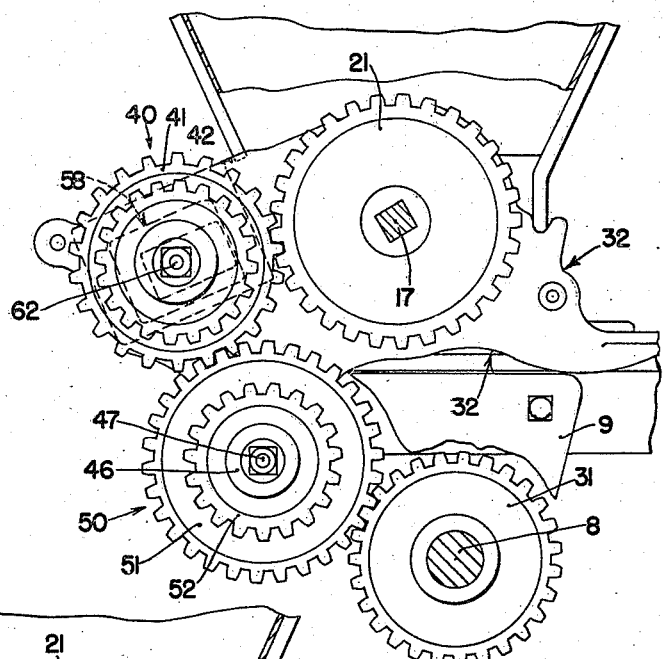
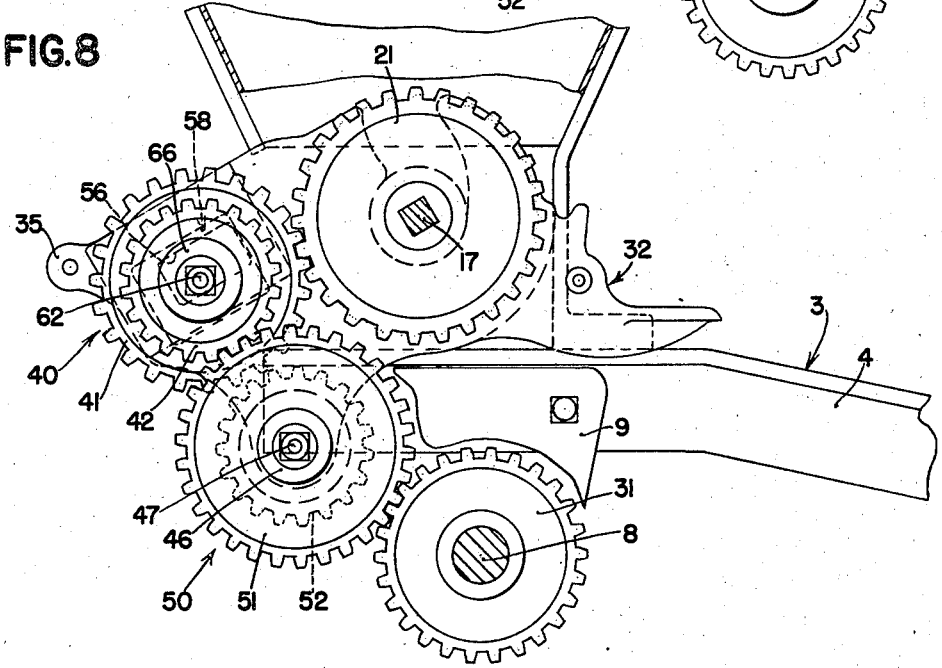
INVENTOR.
THEODORE J. ERDMAN
BY
ATTORNEYS Patented May 21, 1946

2,400,745

UNITED STATES PATENT OFFICE 2,400,745

GRAIN DRILL

Theodore J. Erdman, Horicon, Wis., assignor to The Van Brunt Manufacturing Co., Horicon, Wis., a corporation of Wisconsin Application July 7, 1944, Serial No. 543,806

15 Claims. (Cl. 222—266)

The present invention relates generally to agricultural implements and more particularly to planting implements such as grain drills and the like.

The object and general nature of the present invention is the provision of a new and improved grain drill, the seeding mechanism of which is so constructed and arranged to provide, first, a more simple and less expensive construction than heretofore, and second, an appreciably wider range of feeds. More particularly, it is a feature of this invention to provide a grain drill of the internal double run force feed type, including a double faced wheel having a small and a large size for planting small seeds and large seeds, respectively, with a change speed arrangement consisting essentially of only spur gears. Specifically, it is a feature of this invention to provide, first, double run feed units having adjustable gates shiftable each into ten different positions, and driving mechanism therefor that includes a pair of reversible and interchangeable compound spur gears which by merely changing the position of one or more of them provides for five different speeds of drive for the seeding shaft that actuates the double run force feed units. With a total of twenty gate settings for the double run feed units and a speed change gear unit affording five different speeds, it will be seen that a total of one hundred different seeding rates may be secured. Specifically, it is an important feature of this invention to provide a new and improved gear hanger construction for supporting the two reversible and interchangeable compound gear units so that the gears may not only be meshed with one another but with the driving and driven gears of the grain drill in any of the five different gear positions possible.

These and other objects and advantages of the present invention will be apparent to those skilled in the art after a consideration of the following detailed description, taken in conjunction with the accompanying drawings in which the preferred embodiment has been illustrated.

In the drawings:

Figure 4 shows one side of the double run force feed unit.

Figure 5 shows the other side of the double run feed unit and the compound gears in their next higher speed setting.

Figures 6–8, inclusive, are views similar to Figure 5, showing the compound gear members in their other speed settings.

Figure 1:
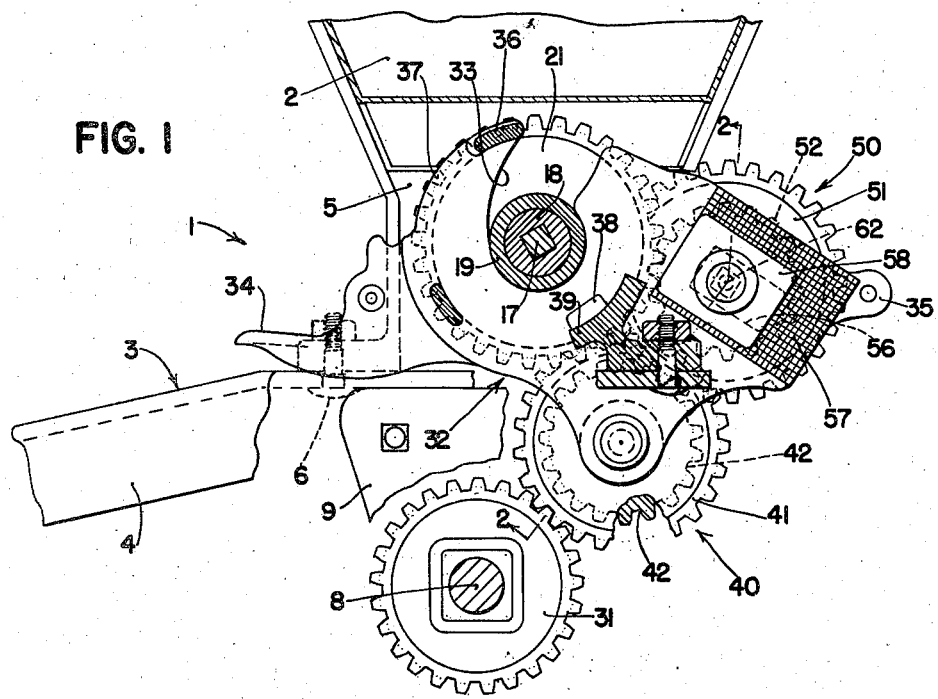
Figure 1 is a transverse sectional view taken near the left end of a grain drill and looking laterally inwardly, showing the driving and driven gears and the associated compound gear mechanism positioned in their lowest speed setting.

Referring now more particularly to Figure 1, the grain drill, which is indicated in its entirety by the reference numeral 1, comprises a seed box 2 mounted on a framework 3 consisting of a plurality of generally longitudinally extending angles 4. The grain or seed box 2 is mounted on the rear ends of the angles 4 by means of suitable end brackets 5 bolted, as at 6, or otherwise secured to the angles 4. The grain drill frame 3 is supported by ground wheels (not shown) connected to the outer ends of an axle 8 which serves as a drive shaft for the seeding mechanism. Along the underside of the seed box 2 is a plurality of internal double run force feed units, or feed cups, each indicated in its entirety by the reference numeral 15. These feed cup units are structurally similar to the seed dispensing mechanism shown in the United States patent to W. A. Van Brunt, No. 1,639,317, dated August 16, 1927, to which reference may be had if necessary. The general construction of the grain drill in which the present invention has been embodied is somewhat similar to the grain drill shown in the United States patent to J. Schaeffer, No. 1,944,672, dated January 23, 1934, to which reference may also be made if desired. In view of the above-mentioned prior patents, detailed description of the seed dispensing mechanism will not be required except to point out the principal differences between the instant construction and the construction shown in the above-mentioned prior patents. It will be seen from Figure 4 that each feed cup unit 15 includes a double faced feed wheel 16 mounted non-rotatably on a square shaft 17 which serves as the driven shaft of the seeding mechanism. The shaft 17 is mounted for rotation in the end brackets 5 in any suitable way, preferably by means of a bearing bushing 18 mounted for rotation in a cup-shaped boss 19 formed on or carried by the end bracket 5. A gear 21, constituting a driven gear, is fixed to the driven shaft 17 so as to rotate the latter, and in the case of wide drills, there may be two driving axles 8, two driven shafts 17, each with its own driven gear 21. Each feed cup unit 15 is provided with suitable means (not shown) by which seed may be prevented from entering one or the other of the sides of the unit. Such means may take the form of the shield mechanism shown in the patent to W. A. Van Brunt, No. 1,639,317, dated August 16, 1927.

According to the present invention, the feed cups or double run force feed units 15 are specially constructed. At each side of the feed wheel 16, the latter is formed with flutes or projections 23 which, in cooperation with a gate 24, serves to deliver the seed in metered quantities to a seed tube or the like (not shown) and which in turn delivers the seed to furrow openers or the like. The gate 24 at one side of the feed wheel 16 is smaller than the gate at the other side, and the gate at each side is mounted for swinging or pivotal motion under the control of a lever 26 to which the portion of the gate serving as a pivot is secured. Each lever 26 is provided with a detent fin 27 and the casing 28 of the feed cup unit is provided at each side with ten notches 29 to receive the detent fin 27. By virtue of this construction, the lever 26 may be sprung slightly to cause it to clear one notch and to move the gate into another position where the fin 27 may enter another notch. Since there are ten notches there are therefore ten different gate settings. It will be understood that the position of the gate 24 controls the rate of flow of seed into the feed wheel 16. The gate and lever for one side of the feed cup unit are shown in Figure 4 while the gate and lever for the other side of the feed cup unit is shown in Figure 5. One is arranged to control the smaller seed while the other is arranged to control the larger seed, and hence the slots have been numbered consecutively from 1 to 10 on one side of the casing 28 and from 11 to 20 on the other side.

A driving gear in the form of a double width pinion 31 is fixed in any suitable manner to the axle or drive shaft 8. A swingable gear hanger or carrier, indicated in its entirety by the reference numeral 32, is swingably supported for rocking movement about the axis of the driven shaft 17. The construction of the gear hanger 32 is quite similar to that shown in the above-mentioned Schaeffer patent, the gear hanger having a diagonal slot 33 which permits the hanger to be mounted over the cup-shaped boss 19 on the bracket 5. Suitable lugs 36 on the bracket 5 cooperate with a flange 37 on the hanger, and the latter is formed with another flange 38 which cooperates with an arcuate abutment 39 on the bracket 5 whereby the hanger is supported for rocking movement about the axis of the shaft 17. The hanger 32 is swung generally about the axis of the shaft 17 into and out of mesh with the driving gear 31 on the axle 8 by means of an arm on the pressure shaft (not shown) by which the tools are raised. The arm on the pressure shaft is adapted to engage a projection 34 on the hanger 32. A spring may be engaged with a second apertured projection 35 on the hanger 32 for yieldably urging the same in a direction to mesh with the lower of the gears carried by the hanger into mesh with the driving gear 31.

The hanger 32 is provided with two bearing members, one of which is adjustable, for receiving two compound gear members which cooperate with one another to transmit the drive from the driving gear 31 to the driven gear 21. Both of these gears are spur gears as are the compound gear members carried by the hanger. The first compound gear member is indicated by the reference numeral 40 and includes two sections 41 and 42 of different diameters. The compound gear member 40 is, in Figures 1, 2 and 4, mounted on a fixed bearing 44 that is formed integrally with or carried by the hanger 32. A cap 46 is disposed at the opposite side of the gear 40 and is apertured, like the fixed gear section 44, to receive a bolt 47 which holds the cap 46 and the gear member 40 in position for free rotation on the hanger 32. The other compound gear member is indicated by the reference numeral 50 and likewise consists of two sections 51 and 52 of different diameters. Preferably, the section 51 is the largest and the section 52 is the smallest, the section 41 being next to the largest in diameter and the section 42 being next to the smallest in diameter.

Figure 2:
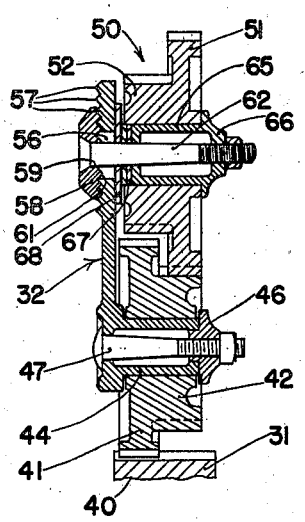
Figure 2 is a fragmentary sectional view taken generally along the line 2—2 of Figure 1.
Figure 3:
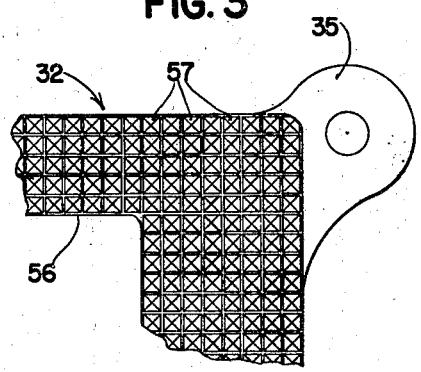
Figure 3 is an enlarged fragmentary view of a portion of the gear hanger.

The present invention is especially concerned with the particular way of mounting the compound gear member 50 on the hanger 32. Referring to Figures 1 and 2, it will be seen that the gear hanger 32 is provided with an enlarged generally rectangular opening 56 which is surrounded by a zone of projections 57 in the nature of a grid, formed on the side of the gear hanger opposite the gear member 50. A clamping plate 58 having an aperture 59 therein, is likewise formed with a grid of projections 61 which are adapted to interlock with the projections 57 in different positions both angularly and linearly of the hanger 32. A bolt 62 extends through the aperture 59 of the clamping plate 58 and also through a bearing or bushing 65 having a hub or cap end 66. Shims 67 are provided between the bearing bushing 65 and the side of the hanger 32, and also an enlarged apertured plate 68 is disposed over the opening 56 in the hanger 32. By virtue of the enlarged opening 56 the bearing 65 for the compound gear member 50 may be shifted toward or away from the axis of the gear 40 and, at the same time, toward or away from the axis of the seeding shaft 17, about which the hanger 32 is swingably mounted. This is possible because the opening 56 is appreciably larger than the bolt 62 passing therethrough. Further, the clamping plate 58 and the interlocking grid projections on the latter and on the gear hanger provide for securely fixing the shiftable bushing 65 in any position of adjustment, merely by tightening the clamping bolt 62 after first disposing the bushing 65 in the desired position.

The operation is substantially as follows:

Reference has been made above to the fact that each of the two gates in the double run feed unit may be adjusted into any one of ten different positions, making a total adjustment of twenty different positions possible. Five different speed changes are provided by the provision of the two component gear members 40 and 50 and the fact that they are not only reversible, that is, each may be turned over, and also interchangeable. For example, Figure 1 shows the compound gear members in the positions they occupy when it is desired to drive the seeding shaft 17 at a relatively slow speed. In this position, the larger section 41 of the compound gear 40 is disposed next to the hanger 32. The larger section 41 of the compound gear member 40 is then in a position to mesh with the double width pinion 31. For this setting the other compound gear member 50 is disposed with the larger section 51 thereof away from the gear hanger 32 and in a position to mesh with the smaller compound gear section 42. At the same time, the smaller compound gear section 52 of the compound gear member 50 is in a position to mesh with the driven gear 21. The present invention is, of course, not to be limited to any particular sizes or ratios of gears, but in one practical embodiment of this invention, the compound gear members 40 and 50, when arranged as shown in Figure 1, provided for driving the seeding shaft 17 at a speed equal to approximately 75% or 80% of the speed of the driving shaft 8.

The setting for the next highest speed is shown in Figure 5. In this figure it will be observed that no change has been made except to reverse the compound gear member 40 and to loosen the bolt 62 in order to shift the other gear member 50 such an amount that the larger gear section 51 thereof may now be meshed with the larger gear section 41 of the lower compound gear 40. In one form of the invention, the arrangement of the gears in this manner provided for driving the seeding shaft at a rate slightly in excess of the rate of rotation of the driving shaft. It will be noted that in shifting the gear 50 to accommodate the new or reversed position of the gear 40, it was necessary to so dispose or shift the gear 50 so that its smaller gear section 52 would remain in mesh with the driven gear 21 while, at the same time, the gear 50 would be spaced far enough away from the gear member 40 to permit meshing the larger section 51 of the gear member 50 with the larger section 41 of the other gear member 40. This, of course, requires a shift of the gear member 50 along the gear hanger 32 in two different directions. This dual shifting of the gear member 50, rather, the support bearing or bushing 44 for the gear member 50, is accommodated by the particular grid projections 57, 61 on the gear hanger 32 and the clamping plate 58, as described above.

The setting of the gears 40 and 50 for the next highest speed is shown in Figure 6. In this setting it will be noted that the gears 40 and 50 have been interchanged, that is, gear 50 has been mounted on the lower bushing 44 while the gear member 40 has been mounted on the shiftable bushing 65. However, the distance between the bushing 65 and the axis of the axle 8 remains the same, since the larger sections of the gears are in mesh with one another and the larger section of the now lower gear meshes with the driving pinion 31. Nevertheless, the shiftable bushing 65 must be moved in order to mesh the smaller section 42 of the compound gear member 40 with the driven gear 21, such movement of the bushing 65, in effect, taking place in the radius about the axis of the lower fixed bearing 44.

The setting of the gears 40 and 50 for the next highest speed is shown in Figure 7. In this setting it will be noted that the gear 50 is mounted on the lower bushing 44 but has been reversed, as compared with its No. 3 setting, so as to dispose the larger section 51 against the gear hanger. Likewise, the gear 40 has been reversed on the shiftable bushing 65, as compared with its No. 3 setting, in order to dispose the larger section 41 of the gear member 40 in mesh with the larger section 51 of the gear member 50 and also with the driven gear 21. In order to effect this change it is, of course, necessary to shift the movable bushing 65 both with respect to the axis of the lower bushing 64 and also with respect to the axis of the gear 21.

The setting for the highest speed is shown in Figure 8, and in this position it will be noted that, as compared with its No. 4 setting, the gear member 50 has been reversed on the bushing 44, the larger section 51 now meshing with the driving pinion 41 and with the smaller gear section 42 of the compound gear member 40, the larger section 41 thereof remaining in mesh with the driven gear 21.

Thus, by virtue of the present invention, it is no longer necessary to employ cone gears or the like, a relatively expensive construction, and merely by the use of two compound spur gear members with a shiftable bushing support for one of them so as to accommodate changing the position of the associated gear in two directions relative to the supporting hanger, I am enabled, with the twenty gate settings, to secure one hundred different seeding rates.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent, is:

1. In a grain drill, the combination of a driven shaft, a driving shaft, and a selective speed transmission operatively connecting said shafts, comprising a gear on the driving shaft, a gear on the driven shaft, a swingable gear carrier, and two intermeshing compound gears each reversibly and interchangeably mounted on said carrier and shiftable therewith into a position connecting said driving and driven gears.

2. In a grain drill, the combination of a driven shaft, a driving shaft, and a selective speed transmission operatively connecting said shafts, comprising a gear on the driving shaft, a gear on the driven shaft, a swingable gear carrier mounted for rocking movement about one of said shafts adjacent the gear thereon and shiftable toward and away from the gear on the other shaft, a first reversible compound gear, a fixed bearing support therefor disposed on said carrier in a position to cause the larger section of said first compound gear to mesh with the gear on said other shaft, a second reversible compound gear, and a bearing support therefor shiftable in either of two different directions relative to said gear carrier, radially with respect to said gear on the driven shaft and also radially with respect to the gear on said fixed bearing support, so as to accommodate the reversal of said second compound gear and the meshing of either its larger section or its smaller section with said one gear and the meshing of its larger section with either of the sections of said first compound gear.

3. In a grain drill having a driving shaft, a driven shaft, and driving and driven gears, respectively, on said driving and driven shafts, a gear hanger swingable about one of said shafts, a stationary bearing on said hanger, a shiftable bearing movably mounted on said hanger for movement into different positions from said stationary bearing and from the axis of said one shaft about which the gear hanger is swingable, and a compound gear mounted on each of said bearings, each of said compound gears including a small gear and a large gear and each of said compound gears being reversible on the associated bearing, said shiftable bearing being movable into different positions so as to dispose the gear on the shiftable bearing in a position meshing with the gear on said one shaft and with the other compound gear.

4. In a grain drill, the combination of a grain feeding shaft, a driving shaft, and a selective speed transmission operatively connecting said shafts, comprising a gear on the driving shaft, a gear on the driven shaft, a swingable gear carrier mounted for rocking movement about one of said shafts adjacent the gear thereon and shiftable toward and away from the gear on the other shaft, a first reversible compound gear, a fixed bearing support therefor disposed on said carrier in a position to cause the larger section of said first compound gear to mesh with the gear on said other shaft, a second reversible compound gear, said gear carrier having an opening therein, a bearing support for said second compound gear shiftable into different positions in said opening so as to dispose either of the sections of said second compound gear in mesh with the gear on said one shaft and in mesh with said first compound gear, and means for clamping said shiftable bearing support to said gear carrier.

5. In a grain drill, the combination of a grain feeding shaft, a driving shaft, and a selective speed transmission operatively connecting said shafts, comprising a gear on the driving shaft, a gear on the driven shaft, a swingable gear carrier mounted for rocking movement about one of said shafts adjacent the gear thereon and shiftable toward and away from the gear on the other shaft, a first reversible compound gear, a fixed bearing support therefor disposed on said carrier in a position to cause the larger section of said first compound gear to mesh with the gear on said other shaft, a second reversible compound gear, said gear carrier having an opening therein, a bearing support for said second compound gear shiftable toward and away from the axis of said one shaft and also toward and away from the axis of said fixed bearing support whereby said second compound gear may be shifted into different positions in said opening so as to dispose either of the sections of said second compound gear in mesh with the gear on said one shaft and in mesh with said first compound gear, and means for clamping said shiftable bearing support to said gear carrier, the shiftable bearing support also being movable into a position accommodating the interchange of said compound gears one for the other.

6. The invention set forth in claim 5, further characterized by said shiftable bearing support comprising an apertured gear-receiving bushing disposed at one side of said gear carrier, an apertured plate at the other side of said opening in the gear carrier, and a bolt smaller than said opening passing through the latter, said plate and bushing for holding the latter fixed in any position of adjustment relative to said gear carrier.

7. The invention set forth in claim 5, further characterized by said shiftable bearing support comprising an apertured gear-receiving bushing disposed at one side of said gear carrier, an apertured plate at the other side of said opening in the gear carrier, said plate and the adjacent portions of said gear carrier surrounding said opening at said other side thereof having cooperating projections adapted to interlock in different positions of said plate about said opening in the gear carrier, and a bolt smaller than said opening passing through the latter, said plate and bushing for holding the latter fixed in any position of adjustment relative to said gear carrier.

8. In a grain drill, a swingable gear carrier comprising a member having means forming an axis about which said carrier is swingable, a gear-receiving bearing fixed on said carrier and spaced from said axis of swinging movement, a second gear-receiving bearing comprising a block movably connected with said carrier and shiftable into different positions radially with respect to both said axis and the axis of said first mentioned gear-receiving bearing and means fixing said block to said carrier in different positions relative thereto.

9. In a grain drill, a swingable gear carrier comprising a member having means forming an axis about which said carrier is swingable, a gear-receiving bearing on said carrier and spaced from said axis of swinging movement, a second gear-receiving bearing movably connected with said carrier and shiftable into different positions radially with respect to both said axis and the axis of said first mentioned gear-receiving bearing, said gear carrier having an enlarged opening and said second gear-receiving bearing comprising a clamping part passing loosely through said opening, a bushing carried by said part at one side of said carrier, and a clamping plate carried by said part at the other side of said carrier.

10. The invention set forth in claim 9, further characterized by said carrier and plate having cooperating projections adapted to be interlocked together in any adjusted position of said plate on said carrier.

11. A grain drill comprising a seed feeding shaft, one or more double run feed cup units driven from said shaft and each including a member having a pair of feeding faces and a gate operable adjacent each face, each gate being adjustable into any one of approximately ten different seed feeding positions, a driving shaft, each of said shafts having a gear thereon, a swingable gear hanger mounted for movement about one of said shafts adjacent the gear thereon and swingable toward and away from the gear on the other shaft, and a pair of reversible and interchangeable compound gear members supported replaceably and rotatably on said hanger, each of said compound gear members having sections of different diameters, and a shiftable bearing unit carrying one of said compound gear members for movement into different radial positions both with respect to the gear on said one shaft and with respect to the other of said compound gear member, the latter being meshable with the gear on said other shaft and said one compound gear member being meshable with the gear on said one shaft, said bearing unit being shiftable into a position providing for the interchange of said compound gear members and their meshing with the gears on said shafts, respectively, whereby with two compound gear members five different speed changes may be effected between the driving and driven shafts, thus cooperating with said double run feed cup units to provide for approximately one hundred different rates of feed.

12. In an agricultural implement, a driving member, a driven member, a double width gear fixed to one member, a second gear fixed to the other member, a gear hanger swingable generally about one member toward and away from the gear on the other member, a pair of compound gears, each having two gear sections of different sizes, and bearing support means shiftably carried by said gear hanger for reversibly and interchangeably receiving said compound gears to selectively connect said driving and driven members.

13. In a grain drill, the combination of a grain driven shaft, a driving shaft, and a selective speed transmission operatively connecting said shafts, comprising a gear on the driving shaft, a gear on the driven shaft, a swingable gear carrier mounted for rocking movement about one of said shafts adjacent the gear thereon and shiftable toward and away from the gear on the other shaft, a first reversible compound gear, a fixed bearing support therefor disposed on said carrier in a position to cause the larger section of said first compound gear to mesh with the gear on said other shaft, a second reversible compound gear, a shiftable bearing support for said second compound gear movable into different positions relative to said gear carrier so as to dispose either of the sections of said second compound gear in mesh with the gear on said one shaft and in mesh with said first compound gear, and means for clamping said shiftable bearing support to said gear carrier.

14. In a grain drill, the combination of a driven shaft, a driving shaft, and a selective speed transmission operatively connecting said shafts, comprising a gear on the driving shaft, a gear on the driven shaft, a gear carrier, a first reversible compound gear, a fixed bearing support therefor disposed on said carrier in a position to cause the larger section of said first compound gear to mesh with the gear on said other shaft, a second reversible compound gear, and a bearing support therefor shiftable in either of two different directions relative to said gear carrier, radially with respect to said gear on the driven shaft and also radially with respect to the gear on said fixed bearing support, so as to accommodate the reversal of said second compound gear and the meshing of either its larger section or its smaller section with said one gear and the meshing of its larger section with either of the sections of said first compound gear.

15. A grain drill comprising a seed feeding shaft, seed feeding devices driven thereby, a driving shaft, each of said shafts having a gear thereon, a gear carrier extending generally between said shafts, a pair of reversible and interchangeable compound gear members supported replaceably and rotatably on said gear carrier, each of said compound gear members having sections of different diameters, a bearing unit shiftably mounted on said carrier and carrying one of said compound gear members for movement relative to said carrier into different radial positions both with respect to the gear on said one shaft and with respect to the other of said compound gear member, the latter being meshable with the gear on said other shaft and said one compound gear member being meshable with the gear on said one shaft, said bearing unit being shiftable into a position providing for the interchange of said compound gear members and their meshing with the gears on said shafts, respectively, whereby with two compound gear members five different speed changes may be effected between the driving and driven shafts, and means providing for interrupting the drive from said driving shaft to said driven shaft through said compound gears.

THEODORE J. ERDMAN.